INVENTOR.
WILLIAM SICHAK
BY Alfred C. Hill
AGENT

Aug. 11, 1964 W. SICHAK 3,144,647

DIVERSITY SYSTEM

Filed Dec. 1, 1959 2 Sheets-Sheet 2

INVENTOR.
WILLIAM SICHAK
BY Alfred C. Hill
AGENT

United States Patent Office 3,144,647

Patented Aug. 11, 1964

3,144,647

DIVERSITY SYSTEM

William Sichak, Nutley, N.J., assignor to International Telephone and Telegraph Corporation, Nutley, N.J., a corporation of Maryland Filed Dec. 1, 1959, Ser. No. 856,476

13 Claims. (Cl. 343—100)

This invention relates to diversity systems, and more particularly to an improved angle diversity system.

One of the difficulties encountered in long-distance radio communication systems is that of selective fading, generally regarded as resulting from the interference between those transmitted radio waves which have followed paths of appreciably different lengths. Heretofore, this difficulty had been attacked by various forms of diversity arrangements. One such diversity arrangement is known as space diversity. In space devirsity systems in general, two or more separate antennas at the transmitter and/or receivers are spaced far enough apart such that their fading characterstics are uncorrelated, that is, the signals fade independently of each other. Another diversity system is known as frequency diversity. In frequency diversity systems in general, two or more carrier frequency signals are spaced far enough apart such that their fading characteristics are uncorrelated. Still another diversity arrangement is known as time diversity. In time diversity systems in general, two or more carrier frequency signals are spaced relatively close to each other such that they are correlated, that is, they have substantially the same fading characteristics. These two frequency signals are then delayed with respect to each other in time such that they become uncorrelated.

In each of the above diversity systems the characteristics of two signals have been adjusted to be completely uncorrelated. These three different types of diversity systems have been the systems relied upon in the past to provide desired improvements in long-distance radio communication systems to effectively overcome the resultant fading which takes place in the propagation paths. It has been reported in an article by H. Staras, "Diversity Reception with Correlated Signals," Journal of Applied Physics, page 93, January 1956, that two signals having correlation coefficients as large as 0.6 cause little degradation in overall performance in a diversity system. This discovery that it is not necessary to have the signals in a diversity system completely uncorrelated has led to still a fourth type of diversity system which has become known as an angle diversity system.

The angle diversity system which the system of this invention improves includes an arrangement of a parabolic antenna whereby the radiation pattern of the receiving antenna has been split by including two or more feed horns in a parabolic reflector to form at least two separate, narrow lobes to provide two propagation paths for the signals previously transmitted in a single, wide lobe from a transmitting antenna including a single feed horn in a parabolic reflector. This angle diversity system provided a diversity improvement with a correlation coefficient of about 0.5 when the crossover between the two lobes was about 3 db (decibels). If the teachings of this angle diversity system were utilized to provide a two-way communication system there would result a nonsymmetrical feed horn arrangement, with at least three feed horns being incorporated in each parabolic reflector, one feed horn to provide the wide transmitting lobe and two feed horns to provide the separated receiving lobes. This nonsymmetrical arrangement of the prior art angle diversity system is expensive in that three feed horns are necessary in each antenna at the spaced terminals and also tends to be inefficient.

An object of the present invention is to provide an improved angle diversity system which is less expensive and more efficient than the angle diversity system of the prior art.

Another object of the present invention is to provide an angle diversity system including a symmetrical arrangement of feed horns in the parabolic reflectors of the parabolic antennas at each end of a communication path for one-way and two-way communication systems. The symmetry of this diversity system is maintained regardless of the fold of the diversity system, two-fold, four-fold or *n*-fold.

A feature of this invention is the provision of an antenna at the transmitting end of a communication system having a radiation pattern including a plurality of beams disposed in spaced relation with respect to each other for propagation of the output signal of a transmitter on each of the plurality of beams and a plurality of means each coupled to one of the transmission beams to recover the signal carried thereby and means coupled to the output of each of said plurality of means to combine the recovered signals.

Another feature of this invention is to provide a 180 degree out-of-phase relationship between the currents in the feed horns of the transmitting and receiving antennas to provide a minimum or null in the radiation pattern coincident with the axis of revolution of the parabolic reflector to enhance beam separation for angle diversity systems.

Another feature of this invention is the provision of dual polarized feed horns in both the transmitting and receiving antennas to establish the separated angle diversity beams. Each of the dual polarized horns provides effectively two beams, one of said beams to propagate energy in one polarization, and the other of said beams to propagate energy in an orthogonally related polarization. This arrangement enables the oppositely directed communication paths in a two-way communication system to be separated on a polarization basis, communication in one direction being on said one polarization and communication in the opposite direction being on said orthogonally related polarization.

The above-mentioned and other features and objects of this invention will become more apparent by reference to the following description taken in conjunction with the accompanying drawings, in which.

Figure 1:
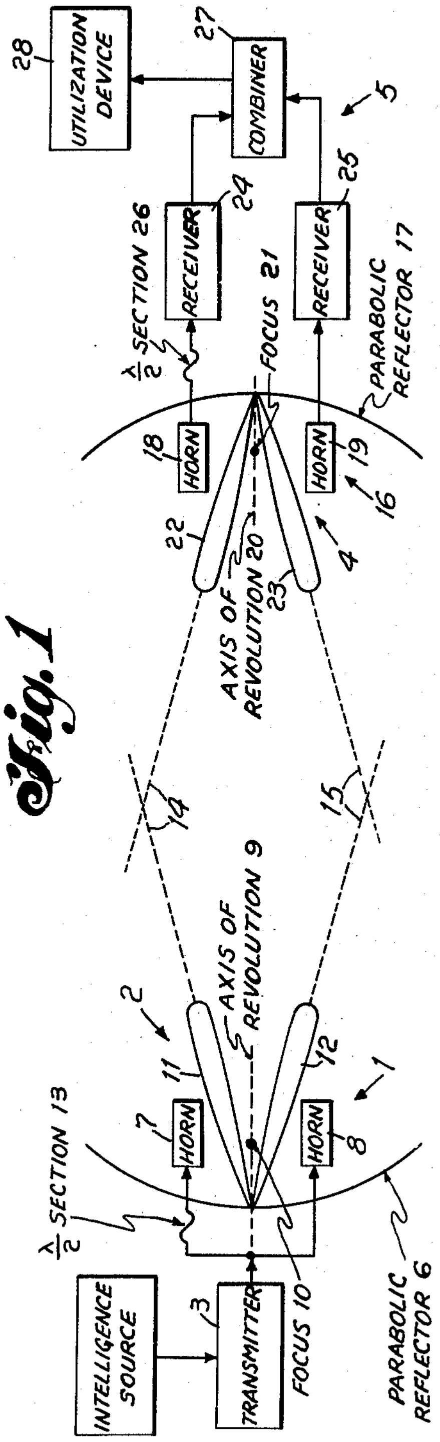
FIG. 1 is a schematic diagram in block form of an angle diversity system following the principles of this invention.

Referring to FIG. 1, the angle diversity system of this invention includes an antenna 1 having a radiation pattern including a plurality of beams 2 disposed in spaced relation with respect to each other, a transmitter 3 coupled to antenna 1 for excitation thereof to radiate the output signal of transmitter 3 on each of the beams 2, a plurality of means 4 each coupled to one of beams 2 to recover the signal carried thereby, and means 5 coupled to each of means 4 to combine the recovered signals.

In greater particularity, antenna 1 includes a parabolic reflector 6 and a pair of feed horns 7 and 8 symmetrically disposed with respect to the axis of revolution 9 adjacent the focus 10 of reflector 6. Horns 7 and 8 are excited by the output of transmitter 3 in a 180 degree phase relationship to produce a minimum or null in the resultant radiation pattern along axis 9 to thereby provide the pair of beams 11 and 12 disposed at an angle to axis 9, each of which propagates the signal of transmitter 3. As illustrated in FIG. 1, the 180 degree phase relationship by which horns 7 and 8 are excited can be provided by a half wave length section 13 with the probes exciting the horns 7 and 8 being disposed to provide current therein in the same direction. Another way of exciting horns 7 and 8 would be to couple the energy from transmitter 3 to horns 7 and 8 without the half wave length section but arranging the probes in these horns so that the currents excited therein are in opposite directions, or in other words in a 180 degree phase relationship.

The signal of transmitter 3 propagated on the separated beams 11 and 12 follow separate propagation paths as indicated by dotted lines 14 and 15, respectively, to the means 4 disposed at a receiving terminal. Means 4 is shown to include an antenna 16 including a parabolic reflector 17 and a pair of feed horns 18 and 19. Horns 18 and 19 are symmetrically disposed with respect to the axis of revolution 20 adjacent focus 21 of reflector 17 to provide a pair of space separated beams 22 and 23 in electromagnetic communication with the propagation paths 14 and 15 and hence, beams 11 and 12. The signals received over paths 14 and 15 by horns 18 and 19 are coupled, respectively, to receivers 24 and 25 in a 180 degree phase relationship to complement the 180 degree phase relationship of the signals exciting antenna 1. This 180 degree relation provides the desired minimum in the radiation pattern of antenna 16 similar to that of antenna 1 and compensates for the 180 degree phase shift imparted to the signals at the transmitting end of the communication link. This 180 degree phase relationship is illustrated in FIG. 1 by the half wave length section 26 coupled between horn 18 and receiver 24.

The output of receivers 24 and 25 is coupled to means 5 which includes a signal combining arrangement 27. Combiner 27 may take any form which will enable the utilization of the signals received by receivers 24 and 25 to obtain a diversity improvement. Combiner 27 could be an equal gain or IF (intermediate frequency) phase combining arrangement wherein receivers 24 and 25 are controlled to have substantially equal gain and the signals at the output of receivers 24 and 25 are controlled to be substantially in phase at the point of addition. The resultant output of combiner 27 is coupled to a utilization device 28. Device 28 may constitute the demodulation portion of a radio receiver terminating in a loudspeaker, or other intelligence reproducing and/or recording system. Device 28 may also constitute the signal coupling between two halves of a repeater station. Although it is preferable to use additive combining techniques in reception of diversity signals, it is to be understood that switching diversity techniques could also be utilized with the angle diversity system described herein.

Utilizing the techniques described herein it is possible to provide a one-way angle diversity communication system wherein the antenna at each end of the link, whether it be a line-of-sight link or an over-the-horizon link, are duplicates of each other. This duplication of equipment at both ends of the link enables an economic saving in that the same antenna may be utilized at either end of the link thereby removing the necessity of fabricating one antenna for transmission and another antenna for reception.

Figure 2:
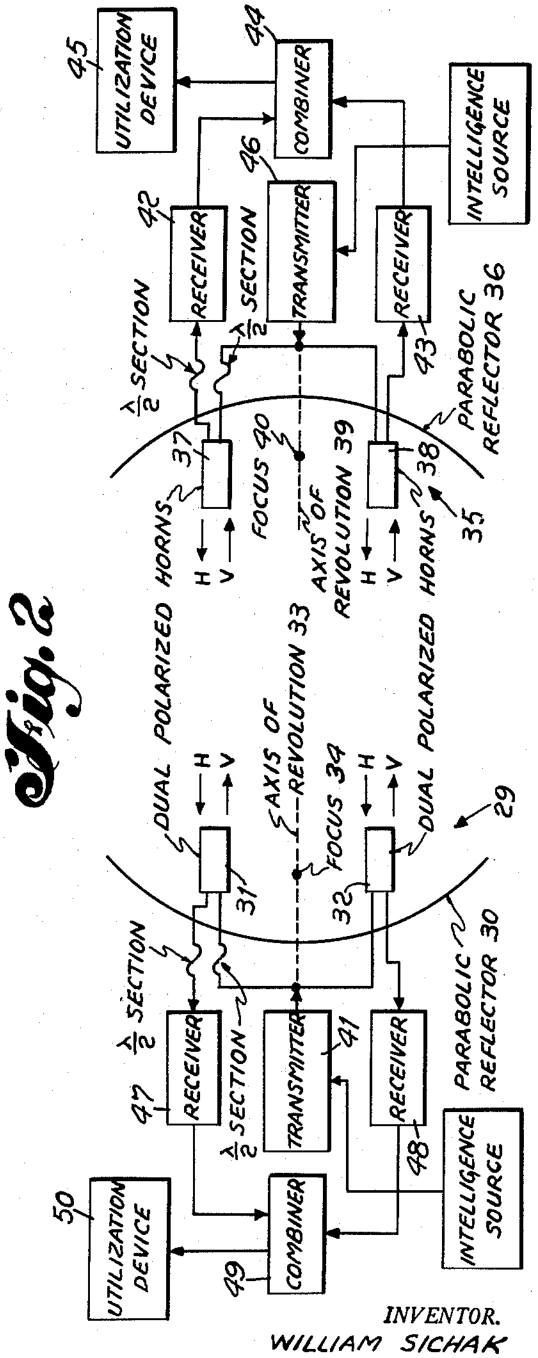
FIG. 2 is a schematic diagram in block form of a two-way angle diversity communication system following the principles of this invention.

Referring now to FIG. 2, there is illustrated therein an angle diversity system utilizing the principles described with respect to FIG. 1 for a two-way communication system. In a two-way communication system utilizing angle diversity in accordance with the principles of this invention, the terminal station or one half of a repeater station at one end of the communication link will include an antenna 29 having a parabolic reflector 30 and a pair of dual polarized feed horns 31 and 32. Horns 31 and 32 are symmetrically disposed with respect to the axis of revolution 33 adjacent focus 34 of reflector 30. The terminal station or one half of a repeater station at the other end of the communication link will include an antenna 35 having a parabolic reflector 36 and a pair of dual polarized feed horns 37 and 38 disposed in a symmetrical relation to the axis of revolution 39 adjacent focus 40 of reflector 36.

Transmission from antenna 29 to antenna 35 is accomplished by coupling the signal of transmitter 41 to the vertical polarization transducer of horns 31 and 32 to excite a vertically polarized wave therein. Horns 31 and 32 are excited 180 degrees out of phase with respect to each other as set forth hereinabove with respect to FIG. 1 in connection with horns 7 and 8. The signal of transmitter 41 propagated from antenna 29 by the vertically polarized beams are received by antenna 35 with the vertical polarization transducer of horns 37 and 38 responding to the received signals of the vertically polarized beams. The outputs of horns 37 and 38 from their vertical polarization transducer are coupled to receivers 42 and 43 in a 180 degree phase relationship to complement the 180 degree phase relationship of the signals exciting the vertical polarization transducer of horns 31 and 32. The output of receivers 42 and 43 is coupled to combiner 44 having the character set forth hereinabove with respect to combiner 27 of FIG. 1. The output of combiner 44 is coupled to utilization device 45 which may be similar to utilization device 28 of FIG. 1.

Transmission from the antenna 35 to antenna 29 in this two-way communication system is achieved by exciting the horizontal polarization transducer of horns 37 and 38 by the signal of transmitter 46 in a 180 degree out-of-phase relationship. The resultant separated beams of horizontally polarized signals travel along their spaced propagation paths from antenna 35 to antenna 29 wherein the horizontal polarization transducer of horns 31 and 32 respond to these beams. The signals received by the horizontal polarization transducer of horns 31 and 32 are coupled to receivers 47 and 48 in a 180 degree out-of-phase relationship to complement the 180 degree phase relationship imparted at antenna 35. The output of receivers 47 and 48 is coupled to a combiner 49 having a characteristic as described hereinabove with respect to combiner 27 of FIG. 1. The output of combiner 49 is coupled to utilization device 50 which may be similar to utilization device 28 of FIG. 1.

Thus, in accordance with the principles of the angle diversity system of this invention, it is possible to provide a two-way angle diversity communication system wherein the terminals at each end of the communication link are identical and the feed horns for the antennas are symmetrically related to the axis of revolution of the antennas. Thus, due to the symmetry and duplication at each end of the terminal the fabrication of a communication link is simplified since there is no requirement for specialized equipment at each end of the communication link.

The description of the two-way communication system of FIG. 2 was described for purposes of illustration with the vertically polarized wave being utilized for communication from antenna 29 to antenna 35 and the horizontally polarized wave being utilized for communication from antenna 35 to antenna 29. It is to be understood, however, that the communication from antenna 35 to antenna 29 may be by the vertically polarized waves and the communication from antenna 29 to antenna 35 may be by the horizontally polarized waves. The only requirement is that the orthogonally related polarization be utilized to separate the oppositely directed communication paths.

Figure 3:
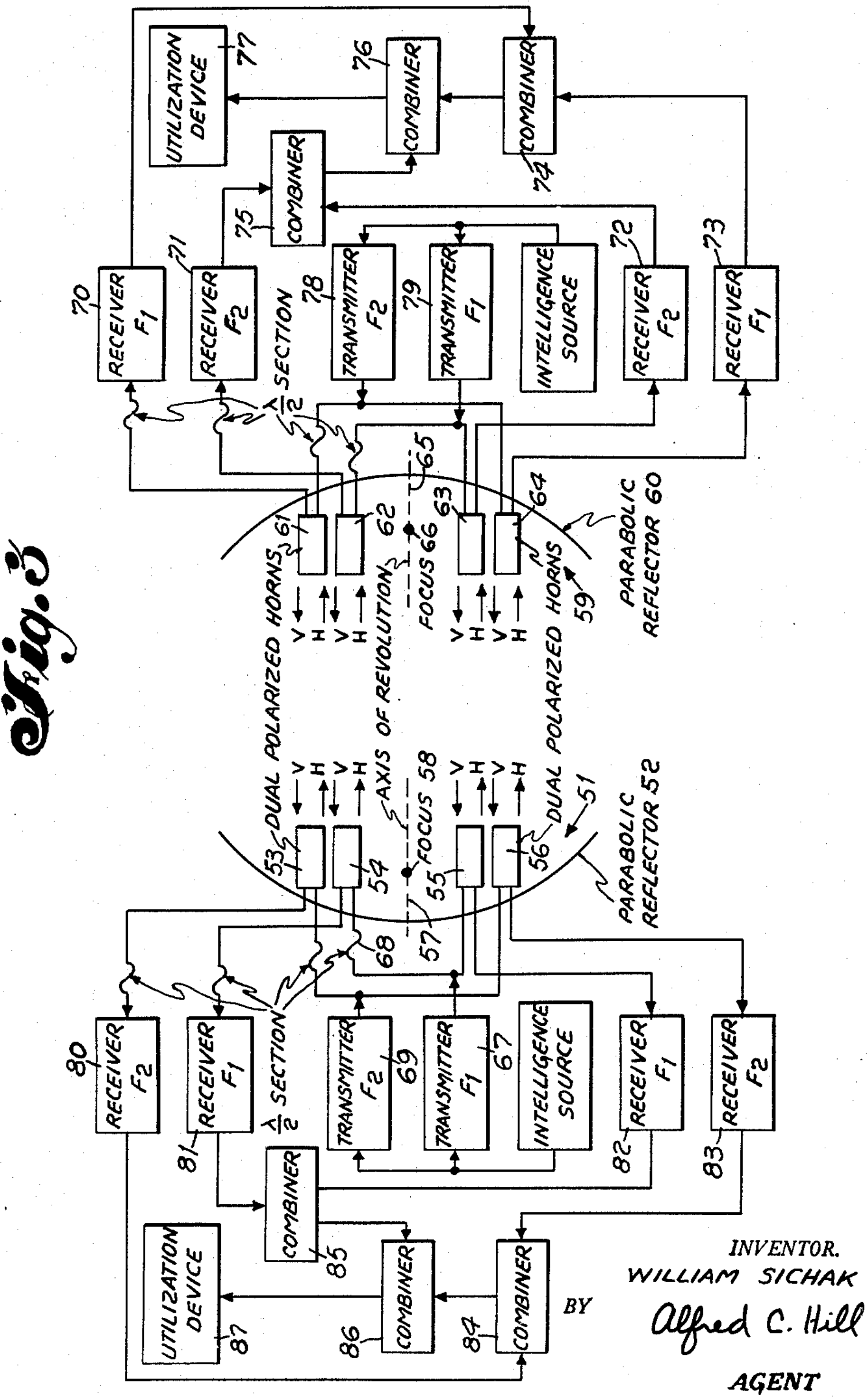
FIG. 3 is a schematic diagram in block form illustrating the resultant quadruple diversity communication system utilizing the principles of this invention.

Referring now to FIG. 3, it is illustrated therein how the principles and components of the angle diversity system of this invention as described in FIGS. 1 and 2 can be utilized in providing a quadruple diversity system maintaining the symmetry of antenna components and identical equipment at each end of the communication link. The quadruple angle diversity system of this invention includes at one end of the communication link an antenna 51 including a parabolic reflector 52 and four dual polarized feed horns 53, 54, 55 and 56. The dual polarized horns are arranged in cooperating pairs with the individual horns of each pair of horns being disposed symmetrically on opposite sides of the axis of revolution 57 adjacent the focus 58 of reflector 51. At the other end of the communication link an antenna 59 includes a parabolic reflector 60 and four dual polarized feed horns 61, 62, 63 and 64. Again the horns are paired with the individual horns of each pair of horns, disposed symmetrically on opposite sides of the axis of revolution 65 adjacent the focus 66 of the parabolic reflector 60.

For communication from antenna 51 to antenna 59 and to provide quadruple diversity advantage, the signal of transmitter 67 at a first frequency $F_1$ is coupled to horns 54 and 55 to excite a pair of horizontally polarized beams for radiation from antenna 51. The output of transmitter 67 is caused to excite antennas 54 and 55 180 degrees out of phase to produce a minimum in the radiation pattern coincident with axis of revolution 57 by the insertion of the half wave length section 68 in the conductor leading to horn 54. The signal of transmitter 69 at a second frequency $F_2$ is coupled to horns 53 and 56 to excite a pair of horizontally polarized beams for radiation from antenna 59. The horns 53 and 56 are also excited 180 degrees out of phase to cause a minimum in the radiation pattern on the axis of revolution 57. The signal is propagated from antenna 51 on four beams arranged in two pairs of beams with the beams of each pair being disposed on opposite sides of the axis of revolution 57 and each of the pairs of beams propagating a different frequency. Thus, the quadruple diversity system includes a first two-fold angle diversity system operating at a first frequency to provide two-folds of the quadruple diversity system and a second two-fold angle diversity system operating at a second frequency spaced from said first frequency to provide the other two-folds of the quadruple diversity system.

The signals transmitted on the four beams radiated from antenna 51 are received in antenna 59 and excite horizontal polarization transducers of the appropriate one of horns 61, 62, 63 and 64. The output from the horizontal polarization transducers of horns 61, 62, 63 and 64 are coupled to the appropriate receivers 70, 71, 72 and 73 as illustrated, with receivers 70 and 73 responding to the signal $F_1$ and the receivers 71 and 72 responding to the signal $F_2$. The outputs of receivers 70 and 73 are coupled to combiner 74 and the outputs of receivers 71 and 72 are combined in combiner 75. The outputs of combiners 74 and 75 are then combined in a similar combiner 76 to produce a single signal for utilization in a utilization device 77.

Communcation from the antenna 59 to antenna 51 is accomplished by transmitters 78 and 79 exciting their associated horns 61, 64 and 62, 63 with signal at a frequency $F_2$ and a signal at a frequency $F_1$, respectively. The horns 61 to 64 are excited by their respective transmitters in the vertical polarization mode and with the appropriate 180 degree phase relationship therebetween to provide the desired spaced beams of vertically polarized waves at an angle with axis of revolution 65 for propagation to antenna 51. The propagated beams from antenna 59 cause the vertical polarization transducers of the appropriate one of horns 53 to 56 to respond for coupling the appropriate signal to receivers 80, 81, 82 and 83 as illustrated to provide the desired quadruple diversity advantage. The outputs of receivers 80 and 83 are coupled to combiner 84 and the outputs of receivers 81 and 82 are coupled to combiner 85. The output of combiners 84 and 85 are coupled to a similar combiner 86 to provide a single signal for utilization in utilization device 87.

While I have described above the principles of my invention in connection with specific apparatus, it is to be clearly understood that this description is made only by way of example and not as a limitation to the scope of my invention as set forth in the objects thereof and in the accompanying claims.

I claim:

1. A diversity communication system comprising a transmitter, an antenna including a parabolic reflector and a plurality of horns even in number, said horns being disposed in a symmetrical relation to the axis of revolution of said reflector and adjacent the focus thereof, means coupling the signal of said transmitter to each of said horns including means to excite one half of said horns 180 degrees out of phase with respect to the other half of said horns for radiation of the signal of said transmitter according to a given polarization in the form of a plurality of beams disposed at an angle with respect to each other and said axis of revolution, a plurality of means responsive to said plurality of beams, each of said responsive means being coupled to one of said beams to recover the signal carried thereby, and means to combine the resultant output signal of each of said plurality of responsive means to provide a single output signal.

2. A diversity communication system comprising a transmitter, an antenna including a parabolic reflector and two horns, said horns being disposed in a symmetrical relation to the axis of revolution of said reflector and adjacent the focus thereof, means coupling the signal of said transmitter to each of said horns including means to excite one of said horns 180 degrees out of phase with respect to the other of said horns for radiation of the signal of said transmitter according to a given polarization in the form of two beams disposed at an angle with respect to each other and said axis of revolution, two means responsive to said two beams, each of said responsive means being coupled to one of said beams to recover the signal carried thereby, and means to combine the resultant output signal of each of said responsive means to provide a single output signal.

3. A diversity communication system comprising a first antenna and a second antenna disposed in electromagnetic wave energy coupling relationship with respect to each other said first and second antennas each including a parabolic reflector and a plurality of horns even in number disposed in a symmetrical relation to the axis of revolution of said reflector and adjacent the focus thereof to provide a radiation pattern having a plurality of beams disposed at an angle with respect to each other, said beams of each of said antennas coacting to provide a plurality of communication paths between said first and second antennas, a transmitter, means coupling the signal of said transmitter to each of said horns of said first antenna to propagate the signal of said transmitter according to a given polarization over each of said paths including means to excite one half of said horns of said first antenna 180 degrees out of phase with respect to the other half of said horns of said first antenna to dispose said beams of said first antenna at an angle with respect to said axis of revolution, a plurality of receivers, means coupling each of said receivers to one of said horns of said second antenna to respond to the signal present on one of said paths including means to shift the signal received by one half of said horns of said second antenna in phase with respect to the signal received by the other half of said horns of said second antenna to complement the 180 degree out-of-phase excitation of said horns of said first antenna and means to combine the output signals of each of said receivers.

4. A diversity communication system comprising a first antenna and a second antenna disposed in electromagnetic wave energy coupling relationship with respect to each other, said first and second antennas each including a parabolic reflector and two horns disposed in a symmetrical relation to the axis of revolution of said reflector and adjacent the focus thereof to provide a radiation pattern having two beams disposed at an angle with respect to each other, said beams of each of said antennas coacting to provide a plurality of communication paths between said first and second antennas, a transmitter, means coupling the signal of said transmitter to each of said horns of said first antenna to propagate the signal of said transmitter according to a given polarization over each of said paths including means to excite one of said horns of said first antenna 180 degrees out of phase with respect to the other of said horns of said first antenna to dispose said beams of said first antenna at an angle with respect to said axis of revolution, two receivers, means coupling each of said receivers to one of said horns of said second antenna to respond to the signal present on one of said paths including means to shift the signal received by one of said horns of said second antenna in phase with respect to the signal received by the other of said horns of said second antenna to complement the 180 degrees out-of-phase excitation of said horns of said first antenna, and means to combine the output signals of each of said receivers.

5. A diversity communication system comprising a first station having a first antenna including a first parabolic reflector and a first plurality of dual polarized horns even in number disposed in a symmetrical relation to the axis of revolution of said first reflector and adjacent the focus thereof to provide a radiation pattern having a first plurality of beams disposed at an angle with respect to each other, a first transmitter, means coupling the signal of said first transmitter to each of said first plurality of horns to propagate the signal of said first transmitter on certain ones of said first plurality of beams according to a first polarization including means to excite one half of said certain ones of said first plurality of horns 180 degrees out of phase with respect to the other half of said certain ones of said first plurality of horns to dispose said certain ones of said first plurality of beams at an angle with despect to the axis of revolution of said first reflector, a first plurality of receivers, a first coupling means coupling each of said first plurality of receivers to one of said first plurality of horns to respond to the signal propagated according to a second polarization orthogonally related to said first polarization on others of said first plurality of beams, and means coupled to the output of each of said first plurality of receivers to combine the output signals thereof; and a second station spaced from said first station having a second antenna including a second parabolic reflector and a second plurality of dual polarized horns even in number disposed in a symmetrical relation to the axis of revolution of said second reflector and adjacent the focus thereof to provide a radiation pattern having a second plurality of beams disposed at an angle with respect to each other, each of said second plurality of beams being in energy coupling relation with one of said first plurality of beams to provide a plurality of communication paths, a second transmitter, means coupling the signal of said second transmitter to each of said second plurality of horns to propagate the signal of said second transmitter on certain ones of said second plurality of beams according to said second polarization including means to excite one half of said certain ones of second plurality of horns 180 degrees out of phase with respect to the other half of said certain ones of said second plurality of horns to dispose said certain ones of said second plurality of beams at an angle with respect to the axis of revolution of said second reflector, a second plurality of receivers, a second coupling means coupling each of said second plurality of receivers to one of said second plurality of horns to respond to the signal propagated according to said first polarization on others of said second plurality of beams and means coupled to the output of each of said second plurality of receivers to combine the output signals thereof, said first and second coupling means each including a 180 degree phase shifting means to complement the exciting means at the transmitter end of their respective communication paths.

6. A diversity communication system comprising a first station having a first antenna including a first parabolic reflector and a first pair of dual polarized horns disposed in a symmetrical relation to the axis of revolution of said first reflector and adjacent the focus thereof to provide a radiation pattern having four beams disposed at an angle with respect to each other, a first transmitter, first coupling means coupling the signal of said first transmitter to each of said first pair of horns for excitation of said first antenna for radiation of the output signal of said first transmitter according to a first polarization on two of the beams of said first antenna including means to excite one of the horns of said first pair of horns 180 degrees out of phase with respect to the other of the horns of said first pair of horns to dispose said two beams of said first antenna at an angle with respect to the axis of revolution of said first reflector, a first pair of receiving means each coupled to one of said first pair of horns, each of said first pair of receiving means being responsive to the signal propagated according to a second polarization orthogonally related to said first polarization on the other two of the beams of said first antenna, and means coupled to the output of each of said first pair of receiving means to combine the output signals thereof; and a second station spaced from said first station having a second antenna including a second parabolic reflector and a second pair of dual polarized horns disposed in a symmetrical relation to the axis of revolution of said reflector and adjacent the focus thereof to provide a radiation pattern having four beams disposed at an angle with respect to each other, each of the four beams of said second antenna being in energy coupling relation with one of the four beams of said first antenna to provide four communication paths, a second transmitter, second coupling means coupling the signal of said second transmitter to each of said second pair of horns for excitation of said second antenna for radiation of the output signal of said second transmitter according to said second polarization on two of the beams of said second antenna including means to excite one of the horns of said second pair of horns 180 degrees out of phase with respect to the other of the horns of said second pair of horns to dispose said two beams of said second antenna at an angle with respect to the axis of revolution of said second reflector, a second plurality of receiving means each coupled to one of said pair of horns, each of said second pair of receiving means being responsive to the signal propagated according to said first polarization on the other two of the beams of said second antenna, and means coupled to the output of each of said second pair of receiving means to combine the output signals thereof, said first and second coupling means each including a 180 degree phase shifting means to complement the exciting means at the transmitter end of their respective communication paths.

7. A diversity communication system comprising a first station including a first antenna having a radiation pattern including a first plurality of beams disposed at an angle with respect to each other, a first transmitter having a first operating frequency coupled to said first antenna for excitation thereof for radiation of the output signal of said first transmitter according to a first mode of propagation on a first group of said first plurality of beams, a second transmitter having a second operating frequency coupled to said first antenna for excitation thereof for radiation of the output signal of said second transmitter according to said first mode of propagation on a second group of said first plurality of beams, a first plurality of receiving means coupled to said first antenna each responsive to the signal of said first operating frequency propagated according to a second mode of propagation orthogonally related to said first mode of propagation on one of a third group of said first plurality of beams, a second plurality of receiving means coupled to said first antenna each responsive to the signal of said second operating frequency propagated according to said second mode on one of a fourth group of said first plurality of beams, first combining means coupled to the output of each of said first plurality of receiving means to combine the output signals thereof, second combining means coupled to the output of each of said second plurality of receiving means to combine the output signals thereof, and a third combining means coupled to the output of said first and second combining means to combine the output signals thereof; and a second station spaced from said first station including a second antenna having a radiation pattern including a second plurality of beams disposed at an angle with respect to each other, each of said second plurality of beams being in energy coupling relation with one of said first plurality of beams to provide a plurality of communications paths, a third transmitter having an operating frequency equal to said first operating frequency coupled to said second antenna for excitation thereof for radiation of the output signal of said third transmitter according to said second mode of propagation on a first group of said second plurality of beams, a fourth transmitter having an operating frequency equal to said second operating frequency coupled to said second antenna for excitation thereof for radiation of the output signal of said fourth transmitter according to said second mode of propagation on a second group of said second plurality of beams, a third plurality of receiving means coupled to said second antenna each responsive to the signal of said first operating frequency propagated according to said first mode of propagation on one of a third group of said second plurality of beams, a fourth plurality of receiving means coupled to said second antenna each responsive to the signal having said second operating frequency propagated according to said first mode of propagation on one of a fourth group of said second plurality of beams, fourth combining means coupled to the output of each of said third plurality of receiving means to combine the output signals thereof, a fifth combining means coupled to the output of each of said fourth plurality of receiving means to combine the output signals thereof, and a sixth combining means coupled to the output of said fourth and fifth combining means to combine the output signals thereof.

8. A diversity communication system comprising a first station having a first antenna including a first parabolic reflector and a first plurality of dual polarized horns disposed relative to said first reflector to provide a radiation pattern including a first plurality of beams disposed at an angle with respect to each other, a first transmitter having a first operating frequency coupled to certain ones of said first plurality of horns for excitation of said first antenna for radiation of the output signal of said first transmitter according to a first polarization on a first group of said first plurality of beams, a second transmitter having a second operating frequency coupled to others of said first plurality of horns for excitation of said first antenna for radiation of the output signal of said second transmitter according to said first polarization on a second group of said first plurality of beams, a first plurality of receiving means coupled to certain ones of said first plurality of horns each responsive to the signal of said first operating frequency propagated according to a second polarization orthogonally related to said first polarization on one of a third group of said first plurality of beams, a second plurality of receiving means coupled to others of said first plurality of horns each responsive to the signal of said second operating frequency propagated according to said second mode of propagation on one of a fourth group of said first plurality of beams, first combining means coupled to the output of each of said first plurality of receiving means to combine the output signals thereof, second combining means coupled to the output of each of said second plurality of receiving means to combine the output signals thereof, and a third combining means coupled to the output of said first and second combining means to combine the output signals thereof; and a second station spaced from said first station having a second antenna including a second parabolic reflector and a second plurality of dual polarized horns disposed relative to said second reflector to provide a radiation pattern including a second plurality of beams disposed at an angle with respect to each other, each of said second plurality of beams being in energy coupling relation with one of said first plurality of beams to provide a plurality of communication paths, a third transmitter having an operating frequency equal to said first operating frequency coupled to certain ones of said second plurality of horns for excitation of said second antenna for radiation of the output signal of said third transmitter according to said second polarization on a first group of said second plurality of beams, a fourth transmitter having an operating frequency equal to said second operating frequency coupled to others of said second plurality of horns for excitation of said second antenna for radiation of the output signal of said fourth transmitter according to said second polarization on a second group of said second plurality of beams, a third plurality of receiving means coupled to certain ones of said second plurality of horns each responsive to the signal of said first operating frequency propagated according to said first polarization on one of a third group of said second plurality of beams, a fourth plurality of receiving means coupled to others of said second plurality of horns each responsive to the signal having said second operating frequency propagated according to said first polarization on one of a fourth group of said second plurality of beams, fourth combining means coupled to the output of each of said plurality of receiving means to combine the output signals thereof, a fifth combining means coupled to the output of each of said fourth plurality of receiving means to combine the output signals thereof, and a sixth combining means coupled to the output of said fourth and fifth combining means to combine the output signals thereof.

9. A diversity communication system comprising a first station having a first antenna including a first parabolic reflector and a first plurality of dual polarized horns even in number disposed in symmetrical relation to the axis of revolution of said first reflector and adjacent the focus thereof to provide a radiation pattern including a first plurality of beams disposed at an angle with respect to each other, a first transmitter having a first operating frequency, means coupling said first transmitter to certain ones of said first plurality of horns for excitation of said first antenna for radiation of the output signal of said first transmitter according to a first polarization on a first group of said first plurality of beams including means to excite one half of said certain ones of said first plurality of horns 180 degrees out of phase with respect to the other half of said certain ones of said first plurality of horns to dispose said first group of said first plurality of beams at an angle with respect to the axis of revolution of said first reflector, a second transmitter having a second operating frequency, means coupling said second transmitter to others of said first plurality of horns for excitation of said first antenna for radiation of the output signal of said second transmitter according to said first polarization on a second group of said first plurality of beams including means to excite one half of said others of said first plurality of horns 180 degrees out of phase with respect to the other half of said others of said first plurality of horns to dispose said second group of said first plurality of beams at an angle with respect to the axis of revolution of said first reflector, a first plurality of receiving means, a first coupling means coupling said first plurality of receiving means to certain ones of said first plurality of horns, each of said first plurality of receiving means being responsive to the signal of said first operating frequency propagated according to a second polarization orthogonally related to said first polarization on one of a third group of said first plurality of beams, a second plurality of receiving means, a second coupling means coupling said second plurality of receiving means to others of said first plurality of horns, each of said plurality of receiving means being responsive to the signal of said second operating frequency propagated according to said second polarization on one of a fourth group of said first plurality of beams, first combining means coupled to the output of each of said first plurality of receiving means to combine the output signals thereof, second combining means coupled to the output of each of said second plurality of receiving means to combine the output signals thereof, and a third combining means coupled to the output of said first and second combining means to combine the output signals thereof; and a second station spaced from said first station having a second antenna including a second parabolic reflector and a second plurality of dual polarized horns even in number disposed in symmetrical relation to the axis of revolution of said second reflector and adjacent the focus thereof to provide a radiation pattern including a second plurality of beams disposed at an angle with respect to each other, each of said second plurality of beams being in energy coupling relation with one of said first plurality of beams to provide a plurality of communication paths, a third transmitter having an operating frequency equal to said first operating frequency, means coupling said third transmitter to certain ones of said second plurality of horns for excitation of said second antenna for radiation of the output signal of said third transmitter according to said second polarization on a first group of said second plurality of beams including means to excite one half of said certain ones of said second plurality of horns 180 degrees out of phase with respect to the other half of said certain ones of said second plurality of horns to dispose said first group of said second plurality of beams at an angle with respect to the axis of revolution of said second reflector, a fourth transmitter having an operating frequency equal to said second operating frequency, means coupling said fourth transmitter to others of said first plurality of horns for excitation of said second antenna for radiation of the output signal of said fourth transmitter according to said second polarization on a second group of said second plurality of beams including means to excite one half of said others of said second plurality of horns 180 degrees out of phase with respect to the other half of said others of said second plurality of horns to dispose said second group of said second plurality of beams at an angle with respect to the axis of revolution of said second reflector, a third plurality of receiving means, a third coupling means coupling said third plurality of receiving means to certain ones of said second plurality of horns, each of said third plurality of receiving means being responsive to the signal of said first operating frequency propagated according to said first polarization on one of a third group of said second plurality of beams, a fourth coupling means coupling said fourth plurality of receiving means to others of said second plurality of horns, each of said fourth plurality of receiving means being responsive to the signal having said second operating frequency propagated according to said first polarization on one of a fourth group of said second plurality of beams, fourth combining means coupled to the output of each of said third plurality of receiving means to combine the output signals thereof, a fifth combining means coupled to the output of each of said fourth plurality of receiving means to combine the output signals thereof, and a sixth combining means coupled to the output of said fourth and fifth combining means to combine the output signals thereof, said first, second, third and fourth coupling means each including a 180 degree phase shifting means to complement the exciting means at the transmitter end of their respective communication paths.

10. A diversity communication system comprising a first station having a first antenna including a first parabolic reflector and a first group of four dual polarized horns disposed in symmetrical relation to the axis of revolution of said first reflector and adjacent the focus thereof to provide a radiation pattern including eight beams disposed at an angle with respect to each other, a first transmitter having a first operating frequency, means coupling said first transmitter to two of said first group of horns for excitation of said first antenna for radiation of the output signal of said first transmitter according to a first polarization on a first group of two of the beams of said first antenna including means to excite one of said two of said first group of horns 180 degrees out of phase with respect to the other of said two of said first group of horns to dispose the beams of said first group of beams of said first antenna at an angle with respect to the axis of revolution of said first reflector, a second transmitter having a second operating frequency, means coupling said second transmitter to the others of said first group of horns for excitation of said first antenna for radiation of the output signal of said second transmitter according to said first polarization on a second group of two of the beams of said first antenna including means to excite one of said others of said first group of horns 180 degrees out of phase with respect to the other of said others of said first group of horns to dispose said second group of beams of said first antenna at an angle with respect to the axis of revolution of said first reflector, a first group of two receiving means, a first coupling means coupling said first group of receiving means to two of said first group of horns, each of said first group of receiving means being responsive to the signal of said first operating frequency propagated according to a second polarization orthogonally related to said first polarization on one of a third group of two of the beams of said first antenna, a second group of two receiving means, a second coupling means coupling said second group of receiving means to the others of said first group of horns, each of said second group of receiving means being responsive to the signal of said second operating frequency propagated according to said second polarization on one of a fourth group of two of the beams of said first antenna, first combining means coupled to the output of each of said first group of receiving means to combine the output signals thereof, second combining means coupled to the output of each of said second group of receiving means to combine the output signals thereof, and a third combining means coupled to the output of said first and second combining means to combine the output signals thereof; and a second station spaced from said first station having a second antenna including a second parabolic reflector and a second group of four dual polarized horns disposed in symmetrical relation to the axis of revolution of said second reflector and adjacent the focus thereof to provide a radiation pattern including eight beams disposed at an angle with respect to each other, each of said second plurality of beams being in energy coupling relation with one of said first plurality of beams to provide eight communication paths, a third transmitter having an operating frequency equal to said first operating frequency, means coupling said third transmitter to two of said second group of horns for excitation of said second antenna for radiation of the output signal of said third transmitter according to said second polarization on a first group of two of the beams of said second antenna including means to excite one of said two of said second group of horns 180 degrees out of phase with respect to the other of said two of said second group of horns to dispose said first group of beams of said second antenna at an angle with respect to the axis of revolution of said second reflector, a fourth transmitter having an operating frequency equal to said second operating frequency, means coupling said fourth transmitter to the others of said second group of horns for excitation of said second antenna for radiation of the output signal of said fourth transmitter according to said second polarization on a second group of two of the beams of said second antenna including means to excite one of said others of said second group of horns 180 degrees out of phase with respect to the other of said others of said second group of horns to dispose said second group of beams of said second antenna at an angle with respect to the axis of revolution of said second reflector, a third group of two receiving means, a third coupling means coupling said third group of receiving means to two of said second group of horns, each of said third group of receiving means being responsive to the signal of said first operating frequency propagated according to said first polarization on one of a third group of two of the beams of said second antenna, a fourth group of two receiving means, a fourth coupling means coupling said fourth group of receiving means to the others of said second group of horns, each of said fourth group of receiving means being responsive to the signal having said second operating frequency propagated according to said first polarization on one of a fourth group of two of the beams of said second antenna, fourth combining means coupled to the output of each of said third group of receiving means to combine the output signals thereof, a fifth combining means coupled to the output of each of said fourth group of receiving means to combine the output signals thereof, and a sixth combining means coupled to the output of said fourth and fifth combining means to combine the output signals thereof, said first, second, third and fourth coupling means each including a 180 degree phase shifting means to complement the exciting means at the transmitter end of their respective communication paths.

11. In a diversity communication system, a signal transmitting arrangement comprising a transmitter, an antenna including a parabolic reflector and a plurality of horns even in number, said horns being disposed in a symmetrical relation to the axis of revolution of said reflector and adjacent the focus thereof, and means coupling the signal of said transmitter to each of said horns including means to excite one half of said horns 180 degrees out of phase with respect to the other half of said horns for radiation of the signal of said transmitter according to a given polarization on a plurality of beams disposed at an angle with respect to each other and said axis of revolution.

12. In a diversity communication system, a signal receiving arrangement comprising a parabolic reflector and a plurality of horns even in number disposed in a symmetrical relation to the axis of revolution of said reflector and adjacent the focus thereof to provide a radiation pattern having a plurality of beams disposed at an angle with respect to each other, each of said beams providing a receiving path for electromagnetic wave energy having a given polarization, a plurality of receivers, means coupling each of said receivers to one of said horns of said antenna to respond to the electromagnetic energy present on one of said paths including means to shift the signal received by one half of said horns 180 degrees out of phase with respect to the signal received by the other half of said horns to provide a null in said radiation pattern coincident with the axis of revolution of said reflector and means to combine the output signal of each of said receivers.

13. In a diversity communication system, a terminal station comprising an antenna including a parabolic reflector and a plurality of dual polarized horns even in number disposed in a symmetrical relation to the axis of revolution of said reflector and adjacent the focus thereof to provide a radiation pattern having a plurality of beams disposed at an angle with respect to each other, a transmitter, means coupling the signal of said transmitter to each of said plurality of horns to propagate the signal of said transmitter on certain ones of said plurality of beams according to a first polarization including means to excite one half of said plurality of horns 180 degrees out of phase with respect to the other half of said plurality of horns to dispose said certain ones of said plurality of beams at an angle with respect to the axis of revolution of said reflector, a plurality of receivers, means coupling each of said plurality of receivers to one of said plurality of horns to respond to the signal propagated according to a second polarization orthogonally related to said first polarization on others of said plurality of beams, said coupling means including means to shift the signal coupled to one half of said receivers 180 degrees out of phase with respect to the signal coupled to the other half of said receivers to dispose said others of said plurality of beams at an angle with respect to the axis of revolution of said reflector, and means coupled to the output of each of said plurality of receivers to combine the output signals thereof.

References Cited in the file of this patent

UNITED STATES PATENTS

| | | |
|---|---|---|
| 2,108,867 | Mathieu | Feb. 22, 1938 |
| 2,438,987 | Bailey | Apr. 6, 1948 |
| 2,741,759 | Parker et al. | Apr. 10, 1956 |
| 2,956,276 | Friis | Oct. 11, 1960 |
| 2,985,875 | Grisdale et al. | May 23, 1961 |

OTHER REFERENCES

Electrical Communication, June 1956 (pp. 151–154 and pp. 161–164 relied on).

IRE Transaction on Communications Systems, vol. CS–4 (pp. 50–55 relied on—March 1956).